Sept. 9, 1969  C. L. COSHOW  3,465,982

SPINNING REEL DEPTH-GAUGING MEANS

Filed July 28, 1967  2 Sheets-Sheet 1

INVENTOR
Chester L. Coshow

BY *Clive H. Bramson*

ATTORNEY

Sept. 9, 1969  C. L. COSHOW  3,465,982
SPINNING REEL DEPTH-GAUGING MEANS
Filed July 28, 1967  2 Sheets-Sheet 2

INVENTOR
Chester L. Coshow

BY Clive H. Bramson
ATTORNEY

United States Patent Office 3,465,982
Patented Sept. 9, 1969

3,465,982
SPINNING REEL DEPTH-GAUGING MEANS
Chester L. Coshow, 1113 Center St.,
Collinsville, Okla. 74021
Filed July 28, 1967, Ser. No. 656,940
Int. Cl. A01k 89/00
U.S. Cl. 242—84.2                                    12 Claims

ABSTRACT OF THE DISCLOSURE

A spinning reel including metering means for paying-out predetermined lengths of line, comprising a stationary spool having a peripheral surface upon which line can be wound, a revolvable member adjacent to said spool, and a gauge member, the latter being movable between a first position removed from the region of said peripheral surface of said stationary spool and a second position spacedly superposed with respect to said peripheral surface, said gauge member being removably retainable in either said first or second positions, whereby when in said second position line wound about said stationary spool will be spaced above the peripheral surface of said spool in the region of said gauge member and supported by the latter in said region, the length of line subsequently payable from said spool when said gauge member is in the second position being limited to those line windings supported by said gauge member.

---

This invention relates to fishing reels, casting reels, spinning reels and the like and more particularly to an improved spinning reel including metering means controlling the pay-out of predetermined lengths of line.

Whereas fishermen frequently find it desirable to fish at a certain depth, and to do so repeatedly each time the hook is dropped in a particular location, conventional spinning reels, incapable of conveniently and automatically being gauged for the specific depth required, have been found unsatisfactory. Further, anglers desiring to cast to predetermined distances and to repeatedly accomplish such measured casts have been frustrated to this end, especially when a readjustment of a previously gauged distance becomes necessary. Thus, the need for a spinning reel including means for readily adjusting the payable length of line after the desired length thereof has been determined will be well appreciated as a boon to any fisherman.

Accordingly, the consonant with the foregoing, the primary desideratum of the instant invention resides in the provision of a spinning reel having a memory, that is, structurally capable of being automatically set to the depth being fished whereby the hook, regardless of the number of times reeled in and re-dropped, will sink precisely to the originally gauged depth, readjustment of the setting or the absolute elimination of any setting being readily effectuated.

Another object of the present invention is to provide a spinnable reel of the foregoing character which exhibits the appearance of conventional spinning reels and which handles in substantially the same manner as such reels.

Another object of the instant invention resides in the provision of spinning reel depth-gauging means which is actuable from without the housing or casing of the spinning reel and which is easily manipulatable by the thumb of the user.

A further object of this invention resides in the provision of automatic line-metering means on a spinning reel comprising a stationary line-holding spool and a revolvable member including guide means functioning to wind the line about the stationary spool.

A still further object of the invention is to provide a device of the desired character which will be simple in structure, economical of manufacture and highly effective in use.

Other objects and advantages of the instant spinning reel depth-gauging means will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate embodiments of the invention, and together with the description, serve to explain the principles of the invention.

Figure 1:
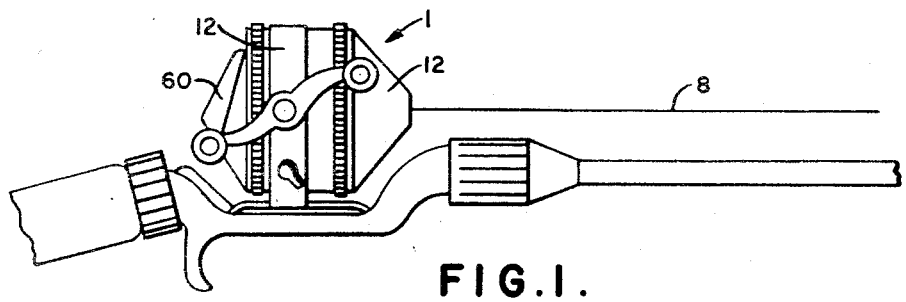
FIGURE 1 is a side elevational view illustrating the manner in which the present spinning reel is attached to a fishing rod.
Figure 2:
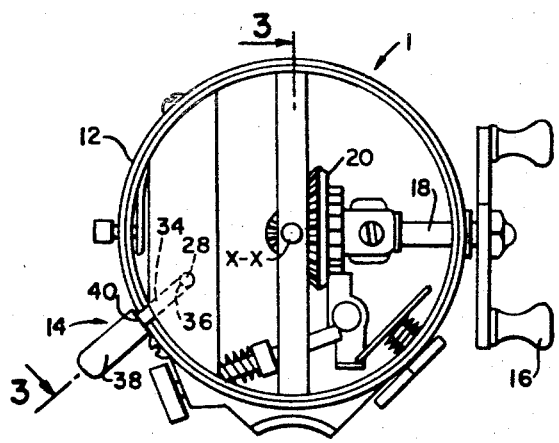
FIGURE 2 is a rear elevational view of the spinning reel with the rear portion of the housing or casing removed.

Referring now in detail to the present preferred embodiment of the invention illustrated in the accompanying drawings, FIGURES 1–5 show the spinning reel designated generally by numeral 1, said reel being comprised of a stationary spool 2 having a peripheral surface 4, a revolvable member 6 adjacent said spool, a line 8 at least partially wound upon the peripheral surface of said spool, guide means 10 provided surfacedly of said revolvable member, a housing or casing 12, and gauge means designated generally by numeral 14.

Figure 4:
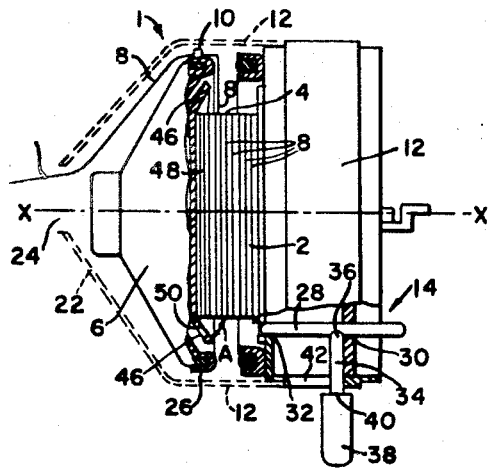
FIGURE 4 is a view in the nature of FIGURE 3 wherein, however, the gauge means is shown in inoperative position and a phantom of the housing covering the removable member is shown.
Figure 5:
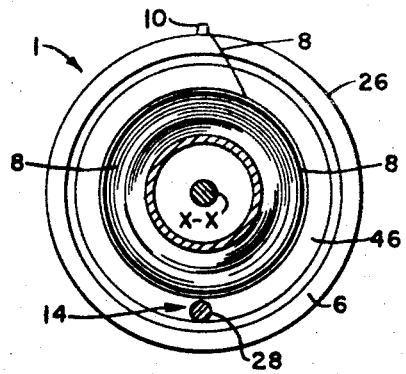
FIGURE 5 is a view taken along line 5—5 of FIGURE 3.

In the embodiment shown, said revolvable member 6 is in axial alignment with the central axis of said stationary spool 2, i.e., said revolvable member and stationary spool share a common axis X—X as illustrated in FIGURE 4 of the drawings. As a consequence of manually turning crank 16, said revolvable member 6, connected to said crank through shaft 18, bevel gear 20 and a corresponding meshing bevel gear (not shown) connected to shaft 18, will be caused to rotate, guide means 10 carried peripherally of said revolvable member being thus caused to rotate about axis X—X. Cover means 22, which forms a part of housing 12, and which encloses said revolvable member 6, guides said line 8 through passage 24 of said cover means, thereby causing said line 8 to slide contiguously across the periphery 26 of said revolvable member, as the latter is caused to rotate. Thus, upon rotation of said member 6, line 8 extending from said stationary spool 2, across the periphery of said revolvable member and through passage 24 of said cover means, is caused to wind about peripheral surface 4 of said stationary spool.

It will be appreciated that said guide means 10 may take other suitable forms, such as the scalloped edge to be described hereinbelow and illustrated in FIGURE 7 of the drawings, the essential purpose thereof being to slidingly snag the line thereby causing the line to wind about the stationary spool as the revolvable member is rotated.

Figure 3:
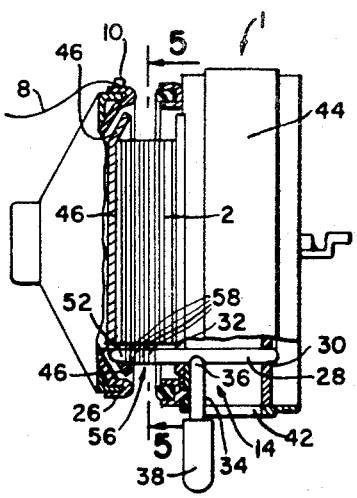
FIGURE 3 is a view taken along line 3—3 of FIGURE 2 showing the gauge means in operative position.

To the end of metering the length of line payable from said stationary spool, i.e., paying-out a predetermined line footage precisely equal in length to the depth fished previous to reeling in the line, the aforementioned gauge means 14 is provided. With particular reference now to FIGURES 3 and 4 of the drawings, said gauge means will be seen to comprise an elongate member 28 which is slidingly supported by apertures 30 and 32 in general parallelism with respect to the peripheral surface 4 of stationary spool 2. That is, as illustrated in FIGURE 4, said elongate member occupies a first position adjacent said peripheral surface and as observed in FIGURE 3, a second position spacedly superposed with respect to said peripheral surface, said gauge means being frictionally and removably retainable in either said first or second positions.

As will be further observed, said gauge means includes handle means, the latter being comprised of a shaft 34 connected at end 36 thereof to said elongate member 28, and a knob 38 connected at the other end 40 of said shaft, said shaft being slidably receivable within slot 42 provided through reel support member 44 and casing 12. Accordingly, movement of said handle means and thus elongate member 28 is readily effectuated from outside of said housing 12.

With further reference to the drawings, the spinning reel 1 will be seen to include a stationary flange portion 46 disposed adjacently of side 48 of the peripheral surface of said stationary spool, said flange forming an acute angle A with respect to said peripheral surface 4.

Opening 50 is provided through said flange portion 46, said opening being in alignment with the axis of movement of said elongate member 28. Accordingly, as illustrated in FIGURE 3, end 52 of said elongate member 28 is received within said opening 50 when said gauge means 14 occupies the aforesaid second position, said end 52, however, being disposed adjacently of the other side 54 of said peripheral surface when said gauge means 14 occupies said first position as observed in FIGURE 4.

Thus, as aforedescribed, and upon manual movement of knob 38, said gauge means is movable between the first and second positions and is removably retainable in either of said positions whereby when in said second position, line wound about said stationary spool 2 will be spaced above the peripheral surface 4 of said spool in the region 56 occupied by said gauge means and supported by elongate member 28 thereof in said region, the length of line subsequently payable from said spool while said elongate member continues to occupy said second position being limited to those winding, e.g., 58, supported by said elongate member. That is, after windings 58 are payed-out, further unwinding of line will be blocked by said elongate member continuing to occupy said second position.

In the operation of the present spinning reel, line 8 is permitted to be payed-out, generally under tension created by the weight of a sinker (not shown), to any desired fishing depth, such paying out being unmetered and being accomplished while gauge means 14 is in the aforedescribed first position. As in the case of most conventional spinning reels, a clutch mechanism is provided for the purpose of releasing the line in order to allow the latter to be payed-out as desired; further out-go of the line being precluded by manipulation of said clutch mechanism. Such line control is similarly afforded by depressing and releasing lever 60 of the instant spinning reel. Further description, however, of the mechanism has been omitted in view of the conventionality thereof.

After the line has been payed-out and partially reeled in whereby the desired fishing depth has been attained, fishing at such depth is continued until a fish is hooked, the bait is taken or for some other reason rendering it necessary to fully reel-in the line. Should the fisherman, however, in advance of fully or partially reeling in the line, decide that he wishes to again drop the line to precisely the depth at which he is presently fishing subsequent to the forthcoming reel-in, he will move knob 38 from the position shown in FIGURE 4 (first position) to the position shown in FIGURE 3 (second position). Henceforth, all line wound about stationary spool 2 will wind about elongate member 28 as well, and upon subsequent pay-out, after re-baiting, e.g., only line included or supported by said elongate member will be payed-out, said member acting as a stop precluding further pay-out of all windings other than those supported thereby. To permit further pay-out, however, to a greater depth, the fisherman must move knob 38 to the first position, whereby further blockage of line pay-out will be obviated.

Figure 6:
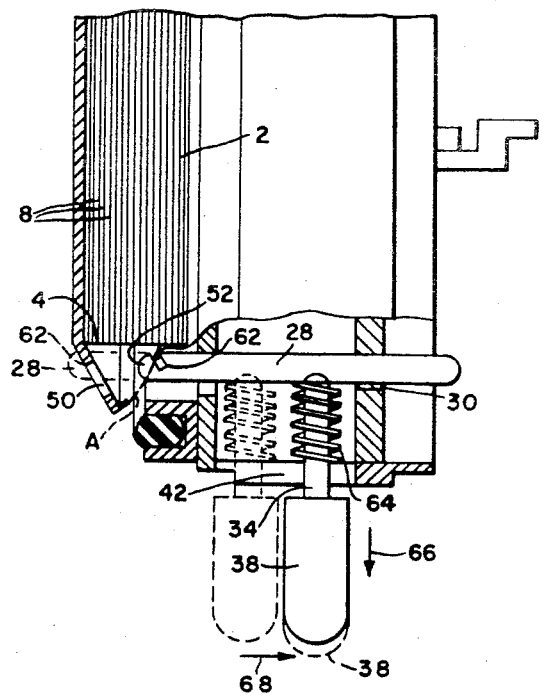
FIGURE 6 is a partially broken-away side elevational view showing a modified construction of the gauge means.

With reference now to FIGURE 6 wherein a modified gauge means construction is shown, like numerals are used to designate like parts shown in FIGURES 1–5. The modification is directed to the end of more positively retaining said elongate member 28 in the second position whereby the chances for inadvertent movement of said member from said second to the first position will be minimized. Specifically, elongate member 28 is provided with a notch 62 disposed inwardly of end 52 thereof, said notch being faced in the direction of peripheral surface 4 of stationary spool 2. Coil spring 64, disposed annularly of shaft 34 and intermediately of said elongate member 28 and slot 42, functions to normally urge said elongate member in the direction of said peripheral surface 4 of said stationary spool 2. Thus, as shown in broken line, said notch 62 will coact with said flange opening 50 to positively retain said elongate member within said opening when said member is moved to the second position. Disengagement of said notch and flange opening is readily accomplishable by pulling knob 38 in the direction of arrow 66 prior to pushing said knob in the direction of arrow 68 and thus to the first position. As shown, apertures 30 and 32 and opening 50 are sufficiently large to permit the aforedescribed inward and outward movement of said elongate member. Thus, by virtue of the placement of notch 62 opposite said peripheral surface 4, movement of said elongate member from the second to the first position will be permitted notwithstanding the possibility that line may be supported by said elongate member.

Figure 7:
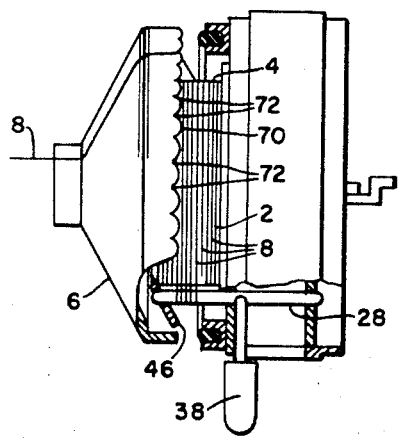
FIGURE 7 is a side elevational view of a modified spinning reel wherein the guide means on the revolvable member comprises the scalloped configuration shown.

Whereas, projection 10 constitutes the guide means utilized with the preferred embodiment for the purpose of effectuating the winding of line 8 about said stationary spool 2, FIGURE 7 illustrates the utilization of a scalloped edge 70 provided as shown on the revolvable member 6. In operation, line 8 will be snagged by any one of the troughs 72 upon rotation of member 6 in the aforedescribed manner to thereby cause said line to be wound about said spool 2. Of course, as stated, other suitable guide means as well fall within the contemplation of the present invention.

What is claimed is:
1. In a spinning reel, a stationary spool having a peripheral surface upon which line can be wound and payed-out from, a revolvable member adjacent said spool, a line at least partially wound upon the peripheral surface of said spool, guide means provided on said revolvable member, said guide means being slidingly contigous with respect to said line when the latter is being wound upon said spool upon rotation of said revolvable member, and gauge means reciprocally disposed within said reel, the latter being movable between a first position adjacent the peripheral surface of said stationary spool and a second position spacedly superposed with respect to said peripheral surface, said gauge means being removably retainable in either said first or second positions, whereby when in said second position line wound about said stationary spool will be spaced above the peripheral surface of said spool in the region occupied by said gauge means and supported by the latter in said region, the length of line subsequently payable from said spool when said gauge means is in the second position being limited to those windings supported by said gauge means.

2. In a spinning reel as set forth in claim 1, wherein said gauge means comprises an elongate member slidingly supported within said reel in parallelism with respect to the peripheral surface of said stationary spool.

3. In a spinning reel as set forth in claim 2 wherein said spinning reel includes a housing, handle means connected to and extending normally of said elongate member, said housing having a slot through which said handle means is slidingly receivable, said handle means extending through said slot whereby movement of said handle means can be effectuated from without said housing.

4. In a spinning reel as set forth in claim 1, including a stationary flange portion disposed adjacently of one side of said peripheral surface of said stationary spool, said flange portion having an opening therein, one end of said gauge means being received within said opening when said gauge means is in said second position, said one end of said gauge means being disposed adjacently the other side of said peripheral surface when said gauge means occupies said first position.

5. In a spinning reel as set forth in claim 3, including a stationary flange portion disposed adjacently of one side of said peripheral surface of said stationary spool, said flange portion having an opening therein, one end of said elongate member being received within said opening when said elongate member is in said second position, said one end of said elongate member being disposed adjacently of the other side of said peripheral surface when said elongate member occupies said first position.

6. In a spinning reel as set forth in claim 5 wherein said elongate member is provided with a notch disposed inwardly of said one end thereof, said notch being faced in the direction of the peripheral surface of said stationary spool, bias means disposed intermediately of said elongate member and said slot in said housing, said bias means normally urging said elongate member in the direction of said peripheral surface.

7. In a spinning reel as set forth in claim 6 wherein said handle means comprises a shaft connected at one end to said elongate member and a knob connected to the other end of said shaft, said knob being disposed without said housing, said bias means comprising a coil spring disposed annularly of said shaft.

8. A spinning reel as set forth in claim 7 wherein said stationary flange forms an acute angle with respect to said peripheral surface.

9. A spinning reel as set forth in claim 8 wherein said guide means comprises a projection disposed on the periphery of said revolvable member.

10. In a spinning reel as set forth in claim 9 wherein the axis of rotation of said revolvable member is in axial alignment with the central axis of said stationary spool, and wherein said housing comprises cover means enclosing said revolvable member, said cover means having a passage therethrough, said passage being in general axial alignment with the axis of rotation of said revolvable member, whereby said line extends from said stationary spool, across the periphery of said revolvable member and through said passage of said cover means.

11. A spinning reel including gauge means for paying-out predetermined lengths of line, comprising a stationary spool having a peripheral surface, a revolvable member adjacent to said spool, said gauge means being movable between a first position adjacent to said peripheral surface of said stationary spool and a second position spacedly superposed with respect to said peripheral surface, said gauge means being removably retainable in either said first or second positions.

12. A spinning reel as set forth in claim 8 wherein said guide means comprises a scalloped edge provided on said revolvable member.

References Cited
UNITED STATES PATENTS

| | | | |
|---|---|---|---|
| 184,663 | 11/1876 | Reichert | 242—107.2 |
| 2,367,214 | 1/1945 | Hedge | 242—96 XR |
| 2,507,457 | 5/1950 | Rix. | |
| 3,113,547 | 12/1963 | Stewart. | |
| 3,176,929 | 4/1965 | Britt | 242—84.1 |
| 3,231,214 | 1/1966 | Gretsinger | 242—107.4 |
| 3,259,333 | 7/1966 | Hull. | |
| 3,275,260 | 9/1966 | Woollen | 242—84.2 |
| 3,298,628 | 1/1967 | Harrington et al. | |
| 3,373,953 | 3/1968 | Grove | 242—104 |

NATHAN L. MINTZ, Primary Examiner

UNITED STATES PATENT AND TRADEMARK OFFICE
Certificate

Patent No. 3,465,982                 Patented September 9, 1969

Chester L. Coshow

Application having been made by Chester L. Coshow, the inventor named in the patent above identified, and Stanco Corporation, a corporation of Oklahoma, the assignee, for the issuance of a certificate under the provisions of Title 35, Section 256, of the United States Code, adding the name of Ray Holmes as a joint inventor, and a showing and proof of facts satisfying the requirements of the said section having been submitted, it is this 1st day of April 1975, certified that the name of the said Ray Holmes is hereby added to the said patent as a joint inventor with the said Chester L. Coshow.

FRED W. SHERLING,
*Associate Solicitor.*